(12) United States Patent
Mahamuni

(10) Patent No.: US 6,912,197 B2
(45) Date of Patent: Jun. 28, 2005

(54) SYSTEM AND METHOD FOR IMPLEMENTING REDUNDANCY FOR MULTILINK POINT TO POINT PROTOCOL

(75) Inventor: Atul B. Mahamuni, San Jose, CA (US)

(73) Assignee: Nokia Inc., Irving, TX (US)

( * ) Notice: Subject to any disclaimer, the term of this patent is extended or adjusted under 35 U.S.C. 154(b) by 16 days.

(21) Appl. No.: 10/302,743

(22) Filed: Nov. 22, 2002

(65) Prior Publication Data

US 2004/0100899 A1 May 27, 2004

(51) Int. Cl.$^7$ .............................................. G01R 31/08
(52) U.S. Cl. ...................................... 370/219; 370/394
(58) Field of Search .............................. 370/216, 217, 370/218, 219, 220, 394, 401, 221, 225, 229, 252, 253; 709/223, 224, 225

(56) References Cited

U.S. PATENT DOCUMENTS

| | | | | |
|---|---|---|---|---|
| 5,848,227 A | * | 12/1998 | Sheu | 714/4 |
| 6,327,243 B1 | * | 12/2001 | Gregorat | 370/218 |
| 6,370,112 B1 | * | 4/2002 | Voelker | 370/218 |
| 6,594,229 B1 | * | 7/2003 | Gregorat | 370/219 |
| 2002/0075873 A1 | * | 6/2002 | Lindhorst-Ko et al. | 370/394 |
| 2002/0089926 A1 | * | 7/2002 | Kloth | 370/220 |
| 2002/0101841 A1 | * | 8/2002 | Kilgore | 370/331 |
| 2002/0126629 A1 | * | 9/2002 | Jiang et al. | 370/328 |
| 2003/0117949 A1 | * | 6/2003 | Moller et al. | 370/219 |

OTHER PUBLICATIONS

K. Sklower et al., The PPP Multilink Protocol (MP)), *Internet Engineering Task Force Network Working Group*, pp. 1–23, Aug. 1996.

* cited by examiner

Primary Examiner—Ricky Ngo
Assistant Examiner—Christine Ng
(74) Attorney, Agent, or Firm—Darby & Darby PC; Jamie L. Wiegand

(57) ABSTRACT

An efficient method and system for maintaining the data connectivity with the MLPPP peer in the event of failure of the processor running the Active MLPPP protocol engine, without requiring expensive, per-packet update messages between the redundant nodes is provided. Grouping of information from multiple bundles is implemented to implement multi-bundle redundancy.

32 Claims, 6 Drawing Sheets

SYSTEM AND METHOD FOR IMPLEMENTING REDUNDANCY FOR MULTILINK POINT TO POINT PROTOCOL

FIELD OF THE INVENTION

The present invention relates to IP networks, and more particularly to redundancy for datalinks.

BACKGROUND OF THE INVENTION

Today's data networks architects that focus on high levels of service-availability may seek to eliminate single points of failure from their data networks by deploying redundant nodes. The network resiliency cannot be achieved unless the data links, such as IETF specified MultiLink Point-to-Point Protocol (MLPPP), are resilient and can tolerate node failures. In case of a node failure within the network, the MLPPP connectivity with the peer would be lost temporarily, resulting in a destabilization of the network.

What is needed is a way to maintain data connectivity with a MLPPP peer with minimal destabilization of the network.

SUMMARY OF THE INVENTION

The present invention is directed at addressing the above-mentioned shortcomings, disadvantages and problems, and will be understood by reading and studying the following specification.

This invention is directed at providing an efficient method and system for maintaining the data connectivity with an MLPPP peer in the event of failure of the processor running the Active MLPPP protocol engine, without requiring expensive, per-packet update messages with the redundant nodes.

According to an aspect of the invention, an efficient method of implementing the redundant MLPPP peer without incurring the overheads of huge communication between the Active and Standby nodes is provided. Grouping of information from multiple bundles is used to implement multi-bundle redundancy.

According to another aspect of the invention, a jump count value is used to estimate a current transmission number during a switch over. The jump count value is set such that an old transmission sequence number is not repeated. This helps to ensure the stability of the network when a switch over occurs.

DETAILED DESCRIPTION OF THE PREFERRED EMBODIMENT

Figure 1:
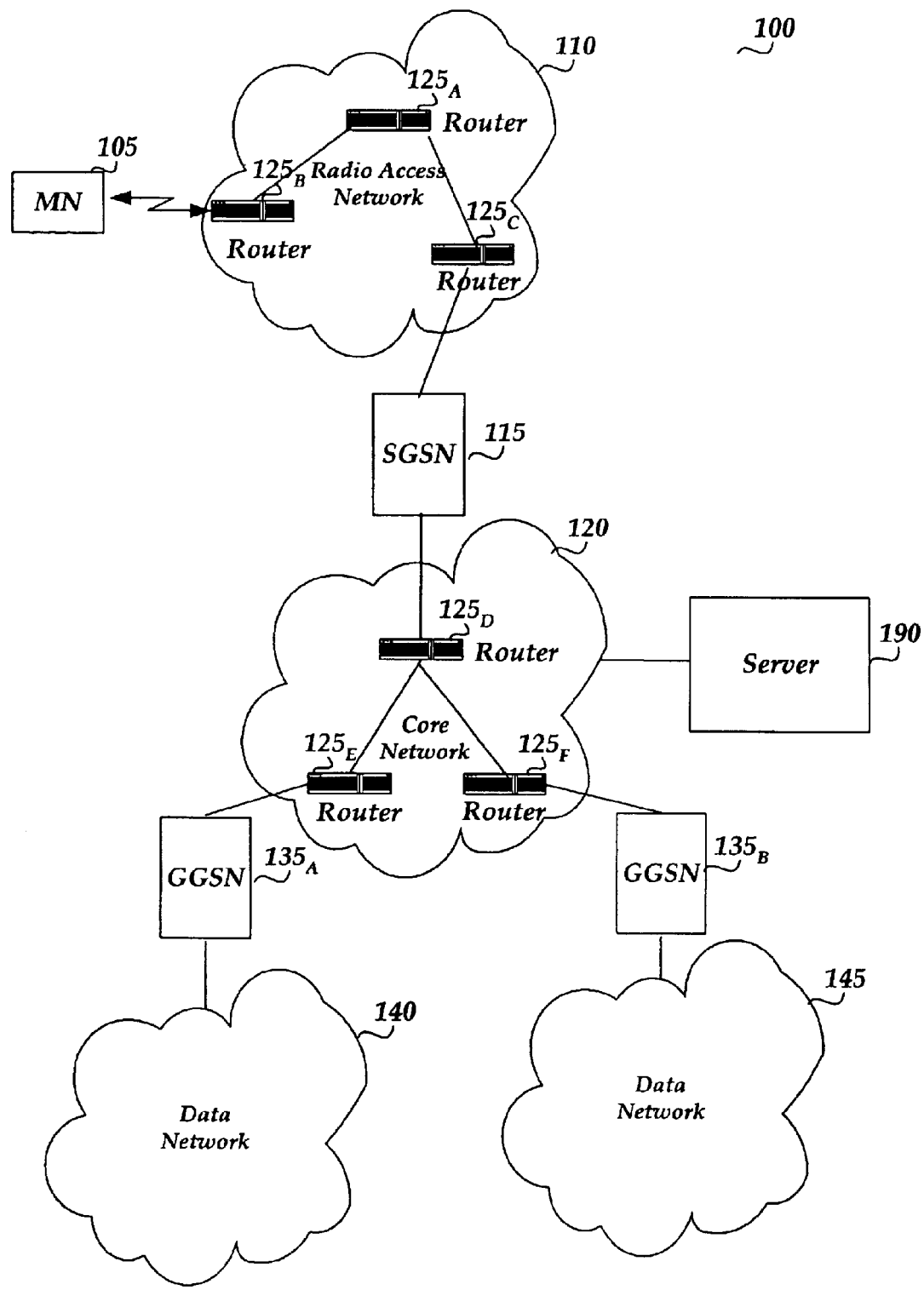
FIG. 1 illustrates an exemplary mobile IP network in which the invention may operate.

In the following detailed description of exemplary embodiments of the invention, reference is made to the accompanied drawings, which form a part hereof, and which is shown by way of illustration, specific exemplary embodiments of which the invention may be practiced. Each embodiment is described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. The term "node" refers to a network element, such as a router. The term "flow" means a flow of packets. The term "user" refers to any person or customer such as a business or organization that employs a node to communicate or access resources over a network. The term "operator" refers to any technician or organization that maintains or services an IP based network. The term "IP" refers to Internet Protocol. The term "ICMP" refers to Internet Control Message Protocol. The term "DNS" refers to Domain Name Service. The term "IPC" refers to Inter-Process Communication. Referring to the drawings, like numbers indicate like parts throughout the views. The term "Tx" means transmit. The term "Rx" means receive. The term "node" indicates either an Active or Standby redundant processing element that executes the PPP/MLPPP protocol state machine and handles MLPPP data path. The term "PPP" means Point-to-Point Protocol. The term "MLPPP" means Multilink Point-to-Point Protocol. Additionally, a reference to the singular includes a reference to the plural unless otherwise stated or is inconsistent with the disclosure herein.

Briefly described, the present invention is directed at providing an efficient method and system for maintaining the data connectivity with the MLPPP peer, without requiring expensive, per-packet update messages between the redundant nodes.

While an embodiment of this invention is described in the context of the MLPPP, it can be used with any protocol that uses sequence number synchronization between communicating peers.

Illustrative Operating Environment

With reference to FIG. 1, an exemplary mobile IP network in which the invention may operate is illustrated. As shown in the figure, mobile IP network 100 includes mobile node (MN) 105, radio access network (RAN) 110, SGSN 115, core network 120, routers $125_{A-F}$, server 190, GGSNs $135_{A-B}$, data network 140, and data network 145.

The connections and operation for mobile IP network 100 will now be described. MN 105 is coupled to radio access network (RAN) 110. Generally, MN 105 may include any device capable of connecting to a wireless network such as radio access network 110. Such devices include cellular telephones, smart phones, handheld computers, personal computers, and the like.

Radio Access Network (RAN) 110 manages the radio resources and provides the user with a mechanism to access core network 120. Radio access network 110 transports information to and from devices capable of wireless communication, such as MN 105. Radio access network 110 may include both wireless and wired components. As shown in the figure, RAN 110 includes routers $125_{A-C}$. Server 190, or some other dedicated network element, may be used to provide Quality of Service (QoS) rules, or some other rules, relating to how the routers process the packets. Briefly described, server 190 may be used to monitor and aid in providing the appropriate behavior model for packet processing within the routers for IP based networks. According to one embodiment, each router may inform the server of information relating to its operation and receive information from the server to set the parameters appropriately.

Core network 120 is an IP packet based backbone network that includes routers, such as routers 125$_{D-F}$, to connect the support nodes in the network. Routers are intermediary devices on a communications network that expedite message delivery. On a single network linking many computers through a mesh of possible connections, a router receives transmitted messages and forwards them to their correct destinations over available routes. A router may be a computer including memory, processors, and network interface units.

Some nodes may be General Packet Radio Service (GPRS) nodes. For example, Serving GPRS Support Node (SGSN) 115 may send and receive data from mobile nodes, such as MN 105, over RAN 110. SGSN 115 also maintains location information relating to MN 105. SGSN 115 communicates between MN 105 and Gateway GPRS Support Node (GGSN)s 135$_{A-B}$ through core network 120. According to one embodiment of the invention, server 190 communicates with RAN 110 and core network 120. GGSNs 135$_{A-B}$ are coupled to core network 120 through routers 125$_{A-C}$ and act as wireless gateways to data networks, such as network 140 and network 145. Networks 140 and 145 may be the public Internet or a private data network. GGSNs 135$_{A-B}$ allow MN 105 to access network 140 and network 145.

The operator may set QoS rules to determine whether or not to accept a packet based on different service classes for a particular user or group of users. For example, conversational traffic from user group A may be carried using standard AF/EF behavior, whereas conversational traffic from user group B may be carried with DSUI behavior. The specific user of MN 105 may be differentiated into one of these user groups by an identifier associated with the user. For example, the identifier may be the user Mobile Station Integrated Services Digital Network (MSISDN) number that is known to both the SGSN and the GGSN support nodes.

Server 190 is coupled to core network 120 through communication mediums. Server 190 may be programmed by an operator with rules to manage the 3GPP quality-of-service (QoS) for mobile IP network 100. More specifically, an operator may generate the rules that are used by the nodes on mobile IP network 100 to help ensure end-to-end QoS. These rules may be supplied to the nodes by server 190. Furthermore, computers, and other related electronic devices may be connected to network 140 and network 145. The public Internet itself may be formed from a vast number of such interconnected networks, computers, and routers. Mobile IP network 100 may include many more components than those shown in FIG. 1. However, the components shown are sufficient to disclose an illustrative embodiment for practicing the present invention.

Figure 2:
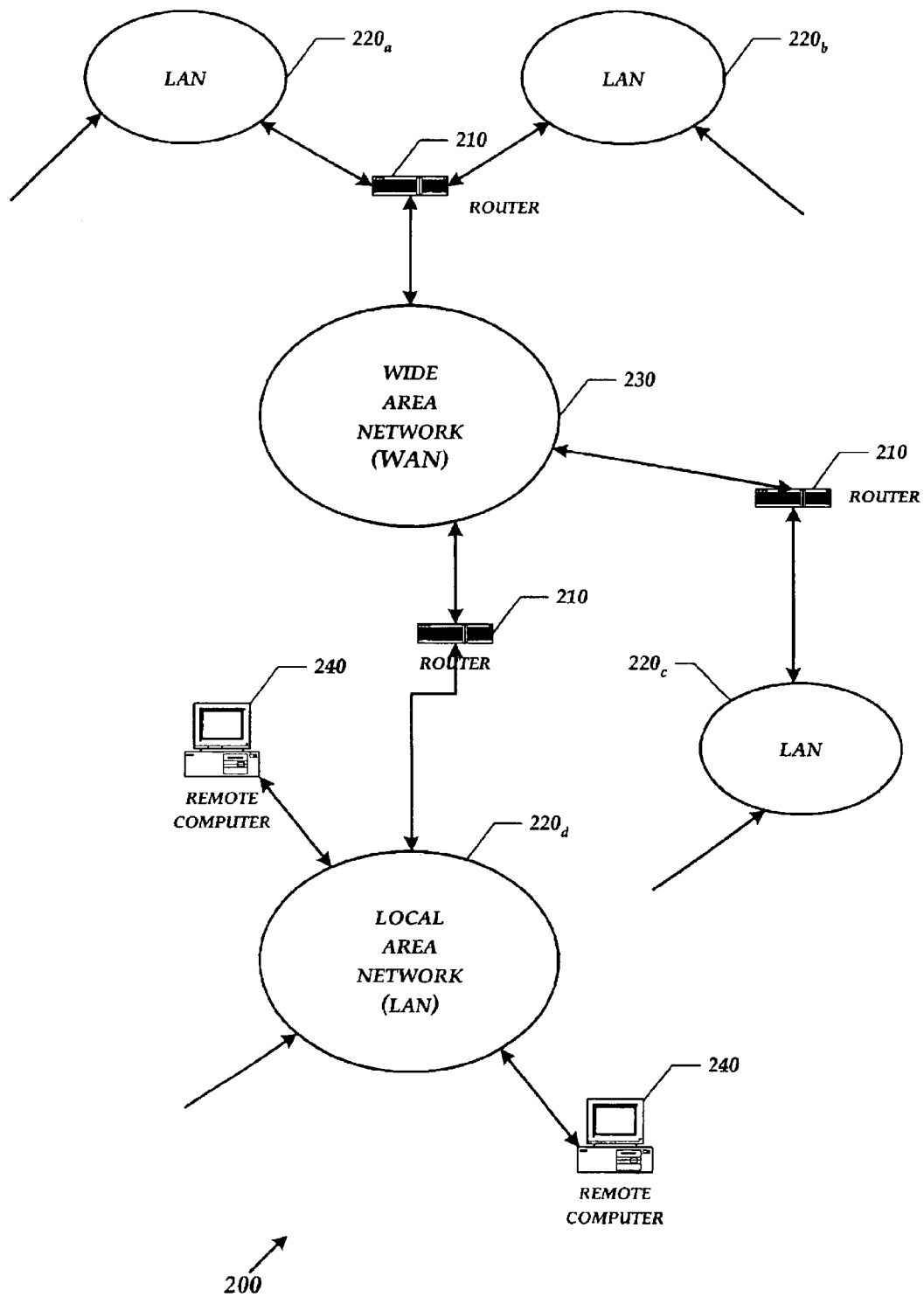
FIG. 2 shows a schematic diagram that illustrates an exemplary system overview in which local area networks and a wide area network are interconnected by routing devices.

FIG. 2 shows another exemplary system in which the invention operates in which a number of local area networks ("LANs") 220$_{a-d}$ and wide area network ("WAN") 230 interconnected by routers 210. On an interconnected set of LANs—including those based on differing architectures and protocols—, a router acts as a link between LANs, enabling messages to be sent from one to another.

Routers 210 are configured such that they include multiple routing cores to support redundant socket control.

Communication links within LANs typically include twisted wire pair, fiber optics, or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links, or other communications links. Furthermore, computers, such as remote computer 240, and other related electronic devices can be remotely connected to either LANs 220$_{a-d}$ or WAN 230 via a modem and temporary telephone link. The number of WANs, LANs, and routers in FIG. 2 may be increased or decreased without departing from the spirit or scope of this invention. As such, the Internet itself may be formed from a vast number of such interconnected networks, computers, and routers and that an embodiment of the invention could be practiced over the Internet without departing from the spirit and scope of the invention.

Redundancy for MLPPP

The MLPPP standard proposes a method for splitting, recombining and sequencing datagrams across multiple logical data links. By means of a four-byte sequencing header, and simple synchronization rules, packets can be split among parallel virtual circuits between systems in such a way that the packets can be correctly reconstructed at the remote-end.

The MLPPP header contains the following fields for the purpose of packet fragmentation and reassembly:

B bit: The (B)eginning fragment bit is a one bit field set to 1 on the first fragment derived from a PPP packet and set to 0 for all other fragments from the same PPP packet.

E bit: The (E)nding fragment bit is a one bit field set to 1 on the last fragment and set to 0 for all other fragments. A fragment may have both the (B)eginning and (E)nding fragment bits set to 1.

Sequence field: The sequence field is a 24 bit or 12 bit number that is incremented for every fragment transmitted. By default, the sequence field is 24 bits long, but can be negotiated to be only 12 bits with a Link Control Protocol (LCP) configuration option described below.

Generic Hot-Standby Redundancy Architecture

When a connection is established between peers a sequence number is used to help coordinate transmission between the peers. The sequence number starts at a value of zero and is incremented by the sender for each fragment sent (modulo the size of sequence space). The sequence number could start at other values. The sequence number allows the receiver to detect fragments that may have become lost on the links. The sequence number is not reset upon each new PPP, packet, and a sequence number is consumed even for those fragments which contain an entire PPP packet, i.e., one in which both the (B)eginning and (E)nding bits are set.

Typically, any generic hot-standby redundancy architecture requires the state of the protocol maintained on both Active and Standby nodes in a synchronized manner. For implementation of redundancy of Multilink-PPP, one needs to build infrastructure for the replication of the following:

PPP protocol state machine: This is relatively stable, and does not require many messages to be communicated between Active and Standby nodes.

MLPPP data packets Transmit and Receive sequence numbers: As mentioned above, the sequence number is incremented for every fragment, and hence communicating the sequence number from Active to Standby for every sequence number update could be very expensive, since the data rates are relatively high.

Figure 3:
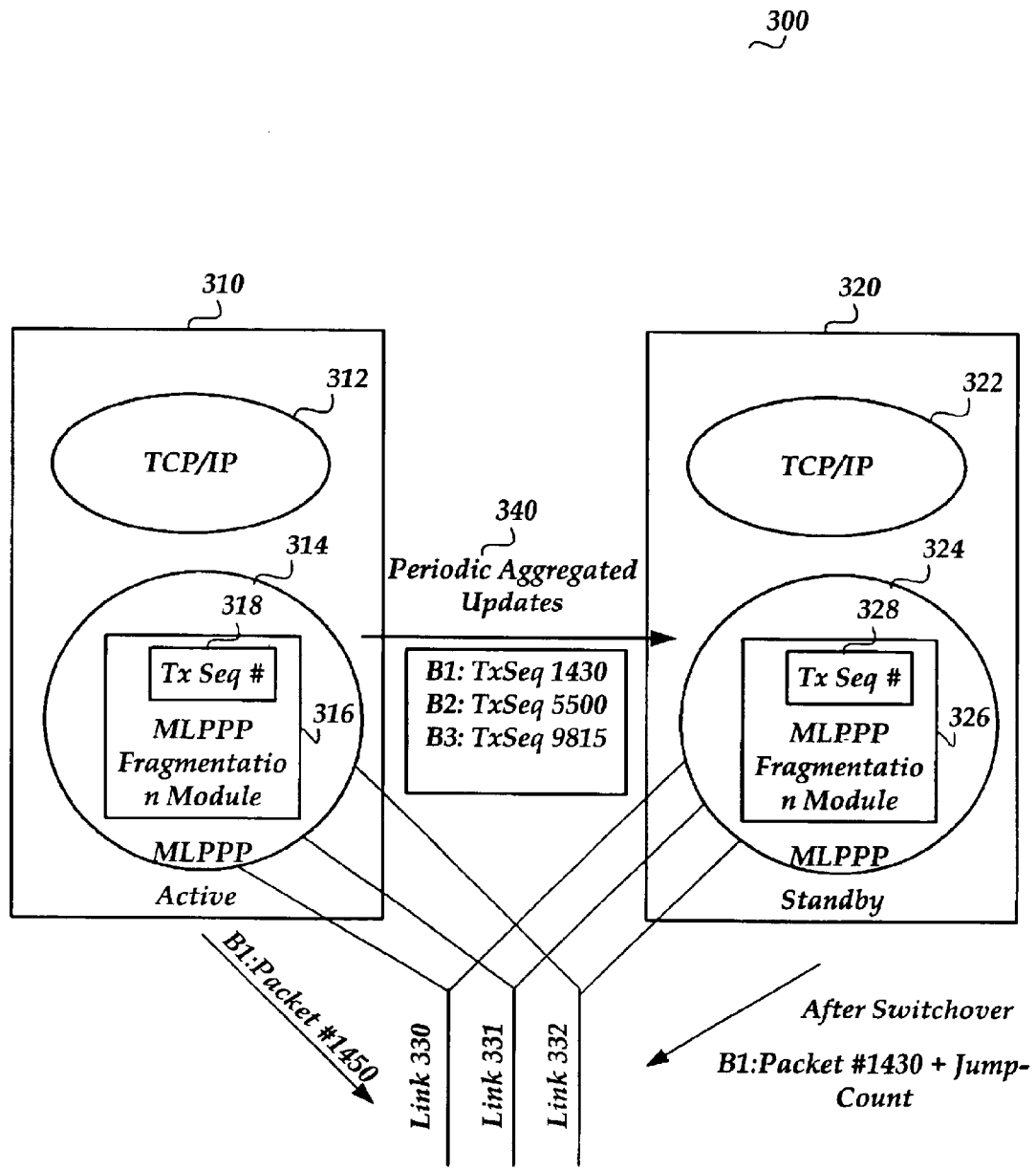
FIGS. 3 and 4 illustrate MLPPP Transmit and Receive sequence redundancy schemes.
Figure 4:
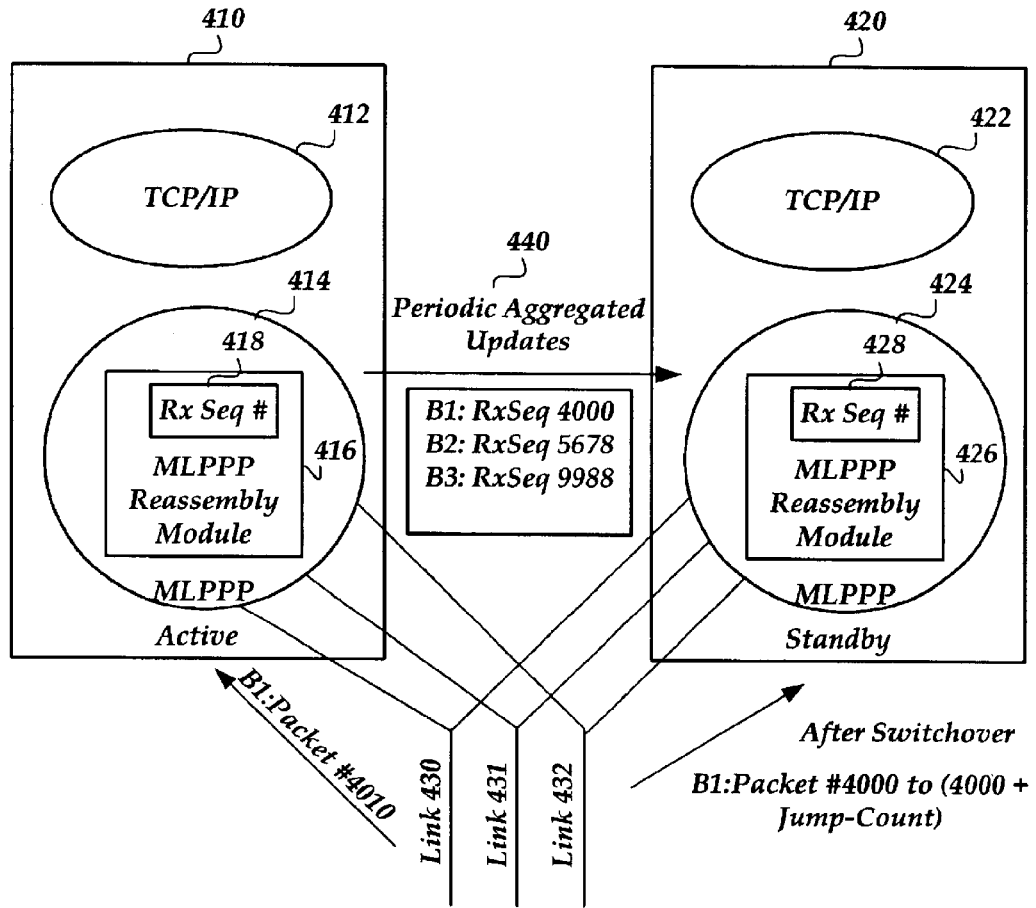

FIGS. 3 and 4 illustrate an exemplary working of MLPPP Transmit and Receive sequence redundancy schemes. In both cases, the sequence numbers are aggregated for all MLPPP-bundles, and are updated on the standby card periodically.

The MLPPP sender increments the sequence number for every fragment that is transmitted. This invention is directed at presenting an efficient method of implementing redundant MLPPP peer without incurring the overheads of huge communication costs between the Active and Standby nodes. This algorithm also introduces grouping of information from multiple bundles to implement multi-bundle redundancy.

The MLPPP sender increments the sequence number for every fragment that is transmitted. This invention presents a method and system of implementing the redundant MLPPP peer without incurring huge communication between the Active and Standby nodes. This method and system also introduces grouping of information from multiple bundles to implement multi-bundle redundancy.

Packet Transmission

FIG. 3, illustrates an MLPPP Transmit sequence redundancy scheme, in accordance with aspects of the invention. As shown in the figure, MLPPP Transmit sequence redundancy scheme 300 includes an active node 310 and a standby node 320. As defined above, active node 310 and standby node 320 are redundant processing elements that execute the PPP/MLPPP protocol state machine and handle the MLPPP data path. Active node 310 and standby node 320 include a Transmission Control Protocol (TCP)/Internet Protocol (IP) module (312 and 322), an MLPPP module (314 and 324), and an MLPPP fragmentation module (316 and 326). MLPPP fragmentation module includes a Tx Seq# (318 and 328).

MLPPP fragmentation module 316 on Active node 310 maintains a transmit sequence number (Tx Seq# 318), which is incremented for each fragment that active node 310 sends through a link, such as links 330–332. Tx sequence number 318 is transmitted to standby node 320 periodically (instead of transmitting it to the Standby node 320 for every fragment sent out of the Active node 310). This reduces the communication overhead between active node 310 and standby node 320. Periodically, Active node 310 collects the transmit sequence numbers for multiple bundles and sends them to Standby node 320. Standby node 320 receives sequence number updates 340 from active node 310 stores updates 340 in its data structures 328.

At any given point of time, standby node 320 does not have the information about the latest transmit sequence number, since the Active node would have transmitted some fragments after sending the last periodic update to the Standby node.

When a switch-over occurs (may be due to reasons such as failure of active node), and standby node 320 takes over as the current active node, the transmit sequence number stored by standby node 320 is slightly out-of-date. If the current active node were to transmit the fragments using this out-of-date sequence number, then it could result in corruption of re-assembled packet at the receiving MLPPP peer, since there will be multiple (different) fragments with the same sequence numbers. In order to avoid this scenario, the current active node "increments" the transmit sequence number by a jump count. The jump count is set such that the transmission sequence number will be larger than a transmission sequence number already used. According to one embodiment of the invention the JUMP-COUNT is the maximum number of fragments that can be sent by the Active node during the time-period between-two successive sequence-number updates to the Standby node. This is a function of line-rates, minimum fragment size and the periodicity of the update messages from Active node to Standby node. According to one embodiment of the invention, the jump-count is calculated as follows:

Jump-Count=Periodicity (Milliseconds)*Aggregated line-rate of the bundle (bytes/second)/Minimum Fragment size*1000)

The Active node increments the transmit-sequence-number by this Jump-Count; when these fragments reach the receiving MLPPP peer, it declares a loss of a few fragments, and it continues to receive all further fragments correctly. The jump count may be calculated by the Standby node when it becomes Active due to a switchover Packets Reception:

FIG. 4 illustrates an MLPP Receive sequence redundancy scheme, in accordance with aspects of the invention. FIG. 4 is substantially similar to FIG. 3, but FIG. 4 relates to reception instead of transmission. As shown in the figure, MLPPP receive sequence redundancy scheme 400 includes an active node 410 and a standby node 420. Active node 410 and standby node 420 include a Transmission Control Protocol (TCP)/Internet Protocol (IP) module (412 and 422), an MLPPP module (414 and 424), and an MLPPP reassembly module (416 and 426). MLPPP fragmentation module includes a Rx Seq# (418 and 428).

Referring now to FIG. 4, when a switch-over occurs and standby node 420 takes over as the current active node 410, the data-receiving algorithm on Standby card goes in a mode where it synchronizes with the first packet received on the line. This means that when the first fragment is received from the remote MLPPP peer, the receiving algorithm resynchronizes itself to the running sequence number, and will then be able to handle the fragments correctly. For robustness reasons, periodic transmission of the received-sequence number from the Active node to the Standby node is implemented according to one embodiment. After a switchover, the current Active card (previously the standby card) accepts only those fragments that are within the acceptable window of the JUMP COUNT size from the last-received sequence number.

Methods

Figure 5:
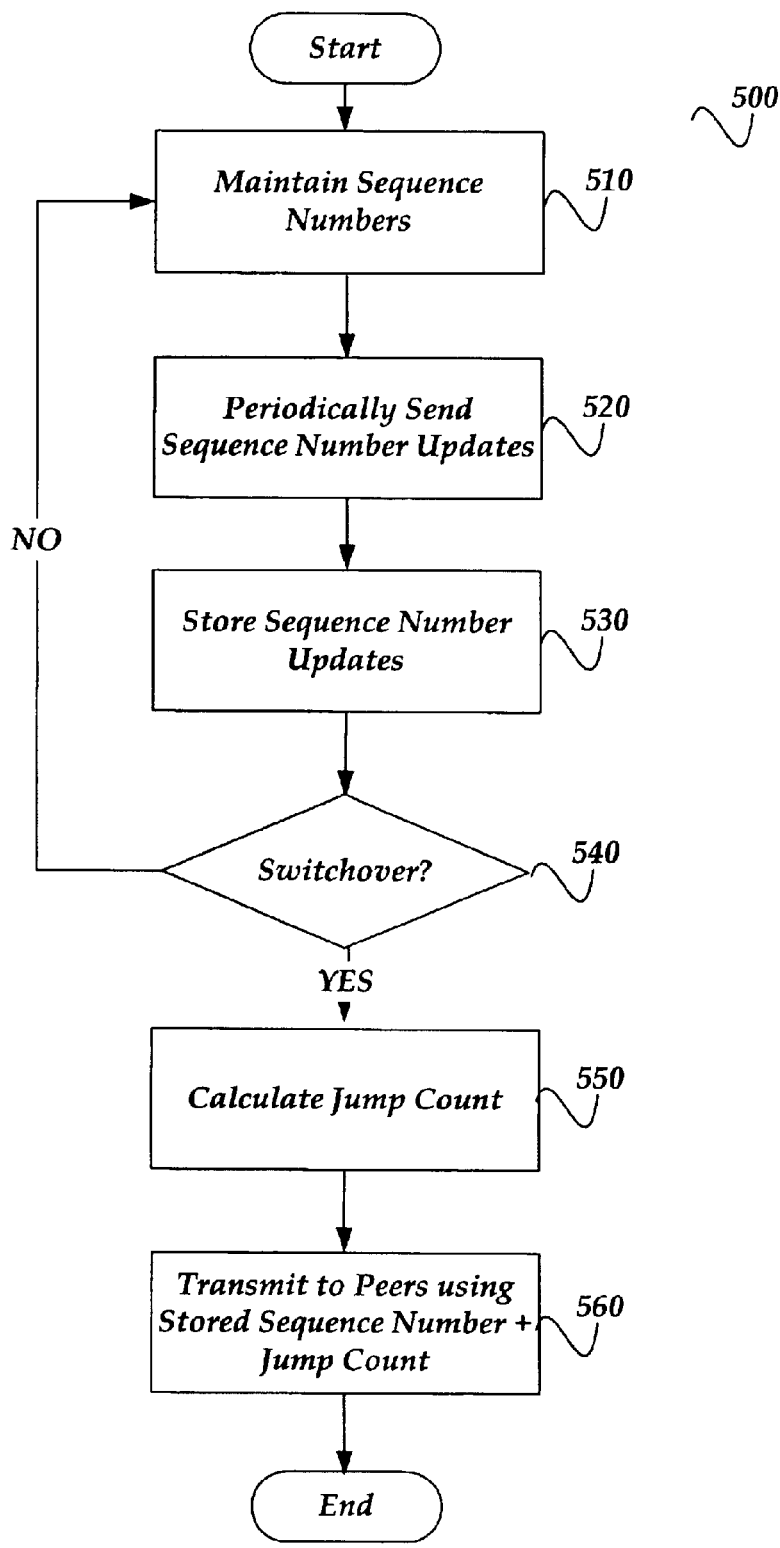
FIGS. 5 and 6 shows processes for implementing a redundant MLPPP peer without incurring the overheads of large amount of communication between active and standby nodes; in accordance with aspects of the invention.
Figure 6:
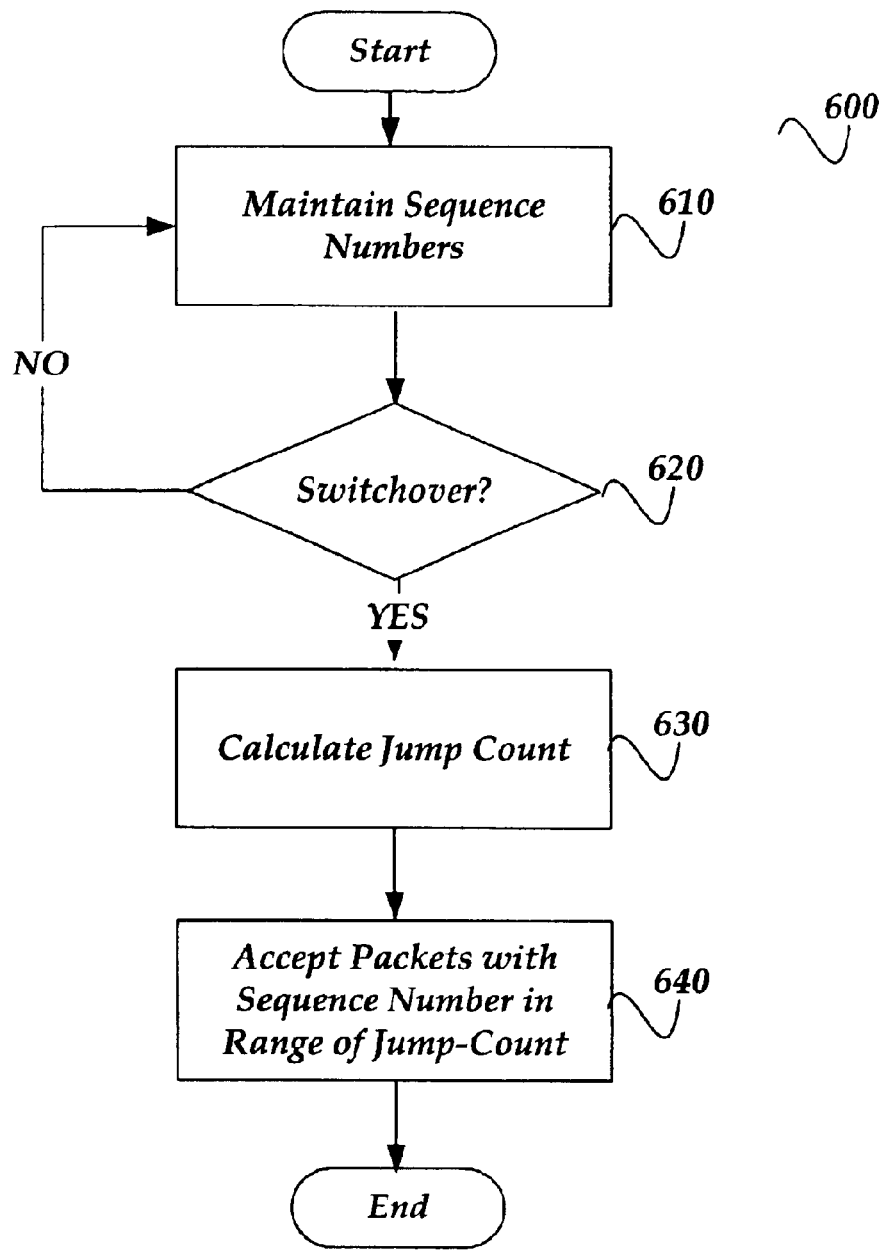

FIGS. 5 and 6 illustrate processes for MLPPP Transmit and Receive sequence redundancy schemes, in accordance with aspects of the invention. Referring now to FIG. 5, which illustrates the Transmit sequence redundancy scheme, after a start block, the process flows to block 510 where sequence numbers are maintained. The sequence number is incremented for each fragment transmitted by a sender. Moving to block 520, sequence number updates are periodically sent to a standby for redundancy. The sequence numbers are only sent periodically to reduce the communication overhead between the active node and the standby node. Flowing to block 530, the sequence number updates are stored by the standby node until needed. The sequence numbers are used by the standby after a switchover. Transitioning to decision block 540, a determination is made as to whether a switchover has occurred. When a switchover has not occurred, the process returns to block 510. When a switchover has occurred, the standby becomes the current active node and the process flows to block 550 where a jump count is calculated. As the sequence numbers stored by the standby are out-of-date since the active node only sends updates periodically, a jump count is calculated to ensure that a sequence number is not reused. A reused sequence number can cause instability within the network. The jump count value is then added to the stored sequence numbers for all new packets that are transmitted. The process then moves to an end block and returns to processing other actions.

Referring now to FIG. 6, which illustrates the Receive sequence redundancy scheme after a start block the process flows to block 610 where the sequence numbers are maintained. Moving to decision block 620, a determination is made as to whether a switchover has occurred. When a switchover occurs, the process moves to block 630 where a jump-count value is calculated. The Jump-count value is then used to determine what packets to accept from other peers. Flowing to block 640, packets that are within the stored packet sequence number and the packet sequence number plus the jump-count value are accepted. The process then moves to an end block and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for implementing redundancy for data links; comprising:
    maintaining a sequence number for each sent fragment on an active node;
    sending the sequence number periodically to a standby node;
    determining when a switch-over occurs, and when:
        switching the standby node from a standby state to an active state;
        calculating a jump-count, wherein the jump-count represents a maximum number of fragments that can be sent by the active node during a time-period between two successive sequence number updates to the standby node;
        calculating a new sequence number based on the jump-count and the last sequence number sent to the standby node; and
        using the new sequence number as a starting point for each sent fragment.

2. The method of claim 1, wherein the data links are multilink point-to-point (MLPPP).

3. The method of claim 1, wherein the active node and the standby node are redundant processing elements in a router.

4. The method of claim 3, wherein the router is in a mobile IP network.

5. The method of claim 1, wherein calculating the new sequence number comprises adding the jump-count to the sequence number.

6. The method of claim 1, wherein calculating the jump-count further comprises setting the jump count such that the sequence number will be larger than a sequence number already used for a transmitted fragment.

7. A method for implementing redundancy for data links; comprising:
    maintaining a sequence number for each sent fragment on an active node;
    sending the sequence number periodically to a standby node;
    determining when a switch-over occurs, and when:
        switching the standby node from a standby state to an active state;
        calculating a jump-count by setting the jump count such that the sequence number will be larger than a sequence number already used for a transmitted fragment, and by determining a maximum number of fragments that can be sent by the active node during the time-period between-two successive sequence-number updates to the standby node;
        calculating a new sequence number based on the jump-count and the last sequence number sent to the standby node; and
        using the new sequence number as a starting point for each sent fragment.

8. The method of claim 7, wherein calculating the jump-count further comprises calculating Periodicity (Milliseconds) times an Aggregated line-rate of the bundle (bytes/second)Minimum Fragment size times 1000.

9. A method for implementing redundancy for data links, comprising:
    determining when a switch-over occurs;
    calculating a jump-count, wherein the jump-count represents a maximum number of fragments that can be sent by an active node during a time-period between two successive sequence number updates to a standby node; and
    using the jump-count in determining what packets to accept from other peers.

10. The method of claim 9, wherein the data links are multilink point-to-point (MLPPP).

11. The method of claim 9, wherein determining when a switch-over occurs, further comprises determining when a switch-over occurs between the active node and the standby node; wherein the active node and the standby node are redundant processing elements in a router.

12. The method of claim 11, wherein the router is in a mobile IP network.

13. The method of claim 9, wherein calculating the jump-count further comprises setting the jump count such that the sequence number will be larger than a sequence number already used for a transmitted fragment.

14. The method of claim 9, wherein using the jump-count in determining what packets to accept from other peers further comprise accepting packets in a ranged that is from a stored sequence number plus the jump-count.

15. A method for implementing redundancy for data links, comprising:
    determining when a switch-over occurs;
    calculating a jump-count by setting the jump count such that the sequence number will be larger than a sequence number already used for a transmitted fragment and by determining a maximum number of fragments that can be sent by an active node during the time-period between-two successive sequence-number updates to a standby node; and
    using the jump-count in determining what packets to accept from other peers.

16. The method of claim 15, calculating the jump-count further comprises calculating a periodicity (Milliseconds) times an aggregated line-rate of the bundle (bytes/second)/ minimum fragment size times 1000.

17. A system for implementing redundancy for data links, comprising:
    an active node that is arranged to:
        communicate with a node and a standby node;
        maintain a sequence number for each sent fragment to the node; and
        periodically send the sequence number to the standby node;
    wherein the standby node is configured to:
        receive the sequence number periodically sent by the active node; and
        store the sequence number;
        determine when a switch-over occurs, and when:
            switch the standby node from a standby state to an active state;

calculate a jump-count, wherein the jump-count represents a maximum number of fragments that can be sent by the active node during a time-period between two successive sequence number updates to the standby node;

calculate a new sequence number based on the jump-count and the last sequence number sent to the standby node; and use the new sequence number for each fragment sent after the calculation.

18. The system of claim 17, wherein the data links are multilink point-to-point (MLPPP).

19. The system of claim 17, wherein the active node and the standby node are redundant processing elements in a router.

20. The system of claim 19, wherein the router is in a mobile IP network.

21. The system of claim 17, wherein calculating the new sequence number comprises adding the jump-count to the sequence number.

22. The system of claim 17, wherein calculating the jump-count further comprises setting the jump count such that the sequence number will be larger than a sequence number already used for a transmitted fragment.

23. A router for implementing redundancy for data links, comprising:

an active node that is arranged to:
communicate with a node and a standby node;
maintain a sequence number for each sent fragment to the node; and
periodically send the sequence number to the standby node;

wherein the standby node is configured to:
receive the sequence number periodically sent by the active node; and
store the sequence number;
determine when a switch-over occurs, and when:
switch the standby node from a standby state to an active state;
calculate a jump-count by determining a maximum number of fragments that can be sent by the active node during the time-period between-two successive sequence-number updates to the standby node;
calculate a new sequence number based on the jump-count and the last sequence number sent to the standby node; and
use the new sequence number for each fragment sent after the calculation.

24. The router of claim 23, wherein calculating the jump-count further comprises calculating periodicity (Milliseconds) times an aggregated line-rate of the bundle (bytes/second)/minimum fragment size times 1000.

25. A system for implementing redundancy for data links, comprising:

a transmission node that is configured to:
communicate with a receiving node;
maintain a sequence number for each sent fragment, wherein the sequence number is used to track lost fragments; and the receiving node that is arranged to determine when a switch-over occurs;

and when calculate a jump-count, wherein the jump-count represents a maximum number of fragments that can be sent by the transmission node during a time-period between two successive sequence number updates to the receiving node; and use the jump-count in determining what incoming packets to accept from other nodes.

26. The system of claim 25, wherein the datalinks are multilink point-to-point (MLPPP).

27. The system of claim 26, wherein the transmission node and the receiving node are redundant processing elements in a router.

28. The system of claim 27, wherein the router is in a mobile IP network.

29. The system of claim 25, wherein calculating the jump-count further comprises setting the jump count such that the sequence number will be larger than a sequence number already used for a transmitted fragment.

30. A system for implementing redundancy for data links, comprising:

a transmission node that is configured to:
communicate with a receiving node;
maintain a sequence number for each sent fragment, wherein the sequence number is used to track lost fragments; and the receiving node that is arranged to determine when a switch-over occurs;

and when calculate a jump-count by setting the jump count such that the sequence number will be larger than a sequence number already used for a transmitted fragment, and further by calculating a periodicity (Milliseconds) times an aggregated line-rate of the bundle (bytes/second)/minimum fragment size times 1000; and use the jump-count in determining what incoming packets to accept from other nodes.

31. The system of claim 30, wherein using the jump-count in determining what incoming packets to accept from other nodes further comprises accepting packets in a range that is from a stored sequence number plus the jump-count.

32. A system for implementing redundancy for data links, comprising:

a transmission node comprising:
a means for maintaining a sequence number for each sent fragment, wherein the sequence number is usable in tracking lost fragments; and a receiving node comprising:
a means for communicating with the transmission node;
if a switch-over occurs, a means for determining a jump-count based, in part, on a periodicity, an aggregated line-rate, and a minimum fragment size; and
a means for using the jump-count in determining what incoming packets to accept from other nodes.

* * * * *

UNITED STATES PATENT AND TRADEMARK OFFICE
CERTIFICATE OF CORRECTION

PATENT NO. : 6,912,197 B2  
DATED : June 28, 2005  
INVENTOR(S) : Atul B. Mahamuni It is certified that error appears in the above-identified patent and that said Letters Patent is hereby corrected as shown below:

Column 6,
Line 23, delete "Intemet" and insert -- Internet --.

Column 8,
Line 11, insert -- / -- before "Minimum".
Line 49, insert -- wherein -- before "calculating".

Signed and Sealed this

Eighth Day of November, 2005

JON W. DUDAS
*Director of the United States Patent and Trademark Office*